Sept. 16, 1969 O. FEUSTEL 3,467,954

MAGNETIC EXCLUSIVE-OR CIRCUIT PROVIDING THE STORAGE OF AN INPUT VARIABLE

Filed June 9, 1966 3 Sheets-Sheet 1

INVENTOR

ORTWIN FEUSTEL

BY Philip M. Bolton

ATTORNEY

INVENTOR
ORTWIN FEUSTEL
BY Philip M. Bolton
ATTORNEY

INVENTOR
ORTWIN FEUSTEL
BY Philip M. Bolton
ATTORNEY

United States Patent Office 3,467,954
Patented Sept. 16, 1969

3,467,954

MAGNETIC EXCLUSIVE-OR CIRCUIT PROVIDING THE STORAGE OF AN INPUT VARIABLE

Ortwin Feustel, Lubbecke, Westphalia, Germany, assignor to International Standard Electric Corporation, New York, N.Y., a corporation of Delaware Filed June 9, 1966, Ser. No. 556,323
Claims priority, application Germany, June 19, 1965, St 23,999
Int. Cl. G11c 7/00
U.S. Cl. 340—174 3 Claims

ABSTRACT OF THE DISCLOSURE

The disclosure describes a Biax memory element which is interrogated by the coincidence of a current pulse on the conductor associated with interrogation, of the same polarity as during the writing process, and with a current pulse, depending in its polarity upon another input variable, on the conductor associated with writing of the other input variable, such that in the case of a coincidence between the store and offered value, there is obtained a signal having a smaller amplitude than in the case of a non-coincidence.

Figure 1:
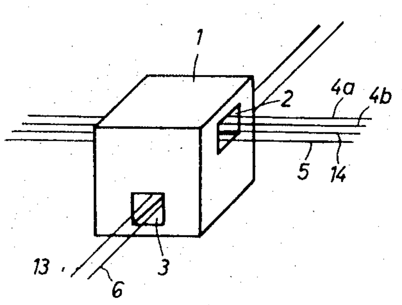

The present invention relates to an EXCLUSIVE-OR circuit for two input variables providing a storing of the one input variable, and employing as a connecting element a Biax magnetic memory element comprising a first hole (storage hole) through which one or more write wires and one read wire are threaded, as well as a second hole (interrogate hole), through which the interrogate wire is threaded, and in which into the Biax memory element the one input variable is written by way of coincidence of a current pulse on the interrogate wire, which is independent with respect to its polarity of the binary value of this input variable, with a current pulse on the write wire which, with respect to its polarity, is dependent upon the binary value of this input variable.

The so-called Biax memory element, in a first type of embodiment relating to storage purposes and, in a second type of embodiment, relating to logical connections, is described in detail on pages 40–54 of the IRE Wescon Convention Record No. 3 (1959). The present invention is based on the first one of these types of embodiments. The Biax memory element consists of a block of a uniformly magnetic material having two non-intersecting holes (apertures, bores) extending vertically in relation to one another. For the purpose of writing into the memory element, in the most simple mode of operation, by applying a current pulse to a conductor associated with writing into the memory element, and which is threaded through the first hole, the magnetic flux around this first hole is switched to change into either the one or the other direction. Prior to, during or subsequently to the writing pulse, by way of applying a current pulse to a conductor threaded through the second hole, the magnetic flux around this hole is always switched into the same direction. Within the area between the two holes, the fluxes surrounding the two holes are superimposed to one another, causing a resulting magnetic flux whose direction is dependent upon the flux direction around the first hole. For effecting the interrogation, a current pulse in the same direction as the one described hereinbefore, is applied to the conductor of the second hole, thus increasing the magnetic flux surrounding this hole. In consequence of this the flux direction within the intermediate area is changed, thus causing the flux around the first hole to be diminished. Caused by this change in the flux linkage a signal, i.e. the output signal is produced on a second conductor which is threaded through the first hole, i.e. the conductor associated with reading of the element.

The output signals for a "0" and a "1" are equal, but differ from one another as regards phase relation. The change in flux occurring during the interrogation, is reversible, so that the readout is effected in a non-destructive manner.

In some cases of practical application of which a few will be mentioned hereinafter, it is favourable to operate with an amplitude discrimination instead of with a phase discrimination when evaluating the read-out signals. From the new way of controlling the Biax memory element, there will result an output signal which is evaluated with the said of an amplitude discrimination.

Any conventional memory element serving the destructive or non-destructive read-out may also be regarded as a logical circuit serving to detect the coincidence or non-coincidence of the polarity of both the interrogating signal and the stored signal. From this way of looking at the mode of operation of a memory element, it will be recognized that in the course of this only the polarity of the one of the two input quantities for the logical circuit, namely that of the stored value is variable, whereas the polarity of the other input quanity, i.e. that of the interrogating signal, remains the same. According to the new way of controlling the Biax memory element, however, also the interrogating signal is variable.

The present invention is characterised by the fact that the Biax memory element is interrogated by the coincidence of a current pulse on the conductor associated with interrogation of the same polarity as during the writing process, with a current pulse depending in its polarity upon the second input variable, on the conductor associated with writing, with the second input variable, so that in the case of a coincidence between the stored and the offered binary value there is obtainable a signal having a smaller amplitude than in the case of a non-coincidence.

In this kind of operation of the Biax memory element there will result an EXCLUSIVE-OR circuit which either alone or in a particularly favourable manner, is capable of being used as a connecting element in an associative storage (memory array), resulting in the well known advantages of an amplitude discrimination.

Figure 1A:
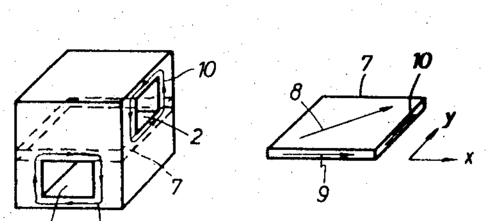
Figure 2A:
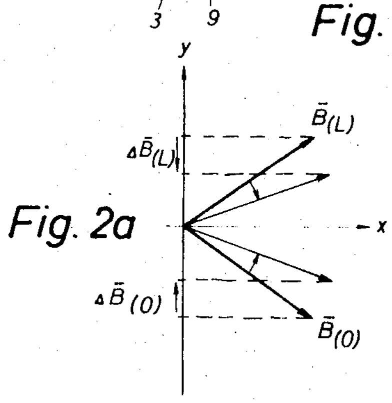
Figure 3A:
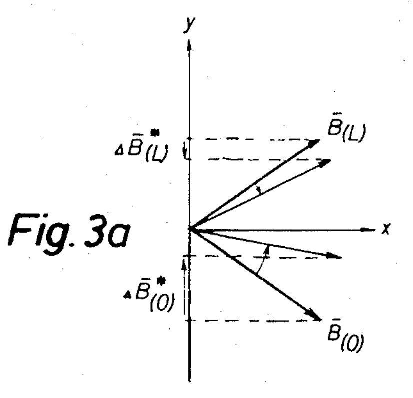
Figure 2B:
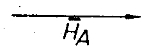
Figure 3B:
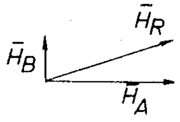
Figure 2C:
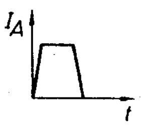
Figure 3C:
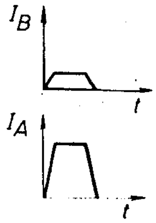
Figure 4:
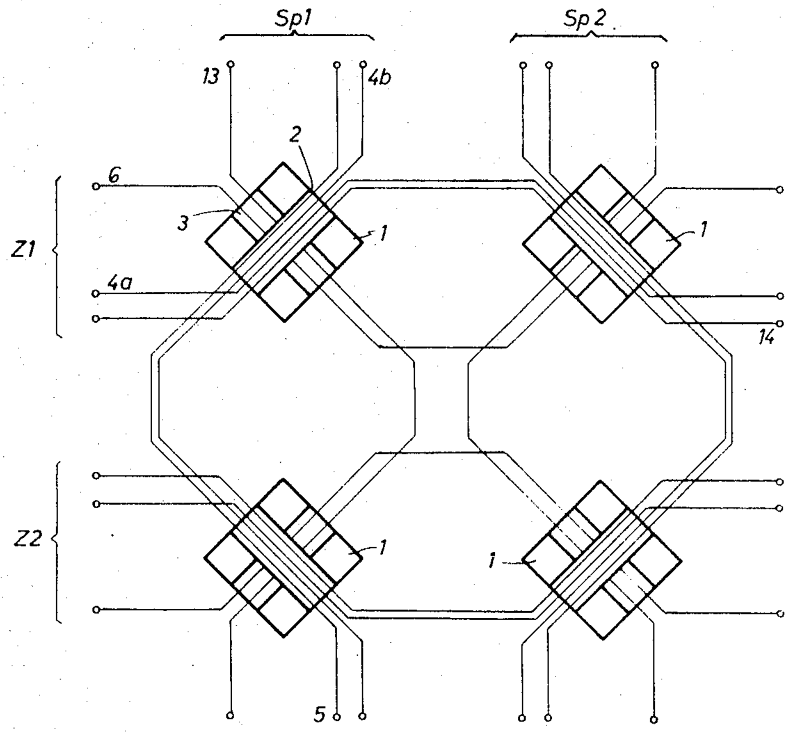
Figure 5:
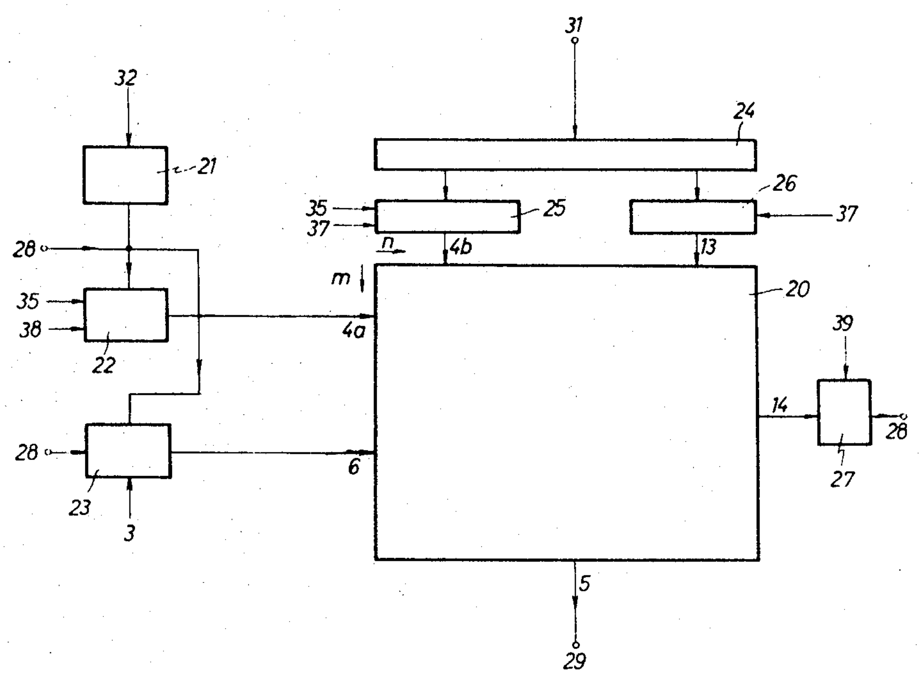

The invention will now be explained in detail with reference to examples shown in the copending drawings, in which:

FIG. 1 shows the conventional Biax memory element,

FIG. 1*a* shows the course of flux relating to the arrangement according to FIG. 1, FIG. 2 shows the conventional interrogation process in a vectorial representation, FIG. 3 shows the novel type of interrogation process in a vectorial representation, FIG. 4 shows a word-organized associative storage matrix with two words consisting of two bits each, and FIG. 5 shows a word-organized associative storage matrix with its associated electronics.

The Biax memory element, as shown in FIG. 1, consists of a uniform block of magnetic material having two circular or orthogonal holes extending vertically in relation to one another, the two holes do not touch each other, i.e. are non-intersecting. In fact, they are arranged in such a way that a layer still remains between the holes (7 in FIG. 1*a*). This intermediate layer does not exist in the Biax memory element used for establishing logical connections. The hole 2 is referred to as the storage hole, and the hole 3 is referred to as the interrogate hole.

For the well known operation of the Biax memory element two conductors associated with writing 4 (4*a* word conductor, 4*b* digit conductor) are required in the storage hole 2, as well as one conductor associated with reading 5, and in the interrogate hole 3 there is required a conductor 6 associated with interrogation of the element.

With the aid of the word conductor 4*a* and the digit conductor 4*b*, the information is written into the Biax memory element e.g. by means of coinciding current pulses on these two conductors. In this way the material surrounding the storage hole is magnetized either in the clockwise or in the counter-clockwise direction (FIG. 1*a*). In order to normalize the flux condition in the Biax memory element, either before or after the writing pulses, a pulse is applied to the conductor 6 associated with interrogation of the element. The fluxes resulting from the currents in the two holes are superimposed to one another in the layer existing between the two holes. This is shown in FIG. 1a. The flux around the storage hole 3 is assumed to have e.g. the direction 9, and the flux around the storage hole 2 is assumed to be in the direction 10. In the layer between the holes these two fluxes result in a flux whose direction is indicated by the reference numeral 8, and there is produced the remanent induction $\overline{B}_{(L)}$ or $\overline{B}_{(O)}$, as shown in FIG. 2*a*.

During the non-destructive read-out of the Biax memory element, and caused by an interrogation pulse of the same polarity as during the normalization, there is effected on the conductor 6 associated with interrogation, a reversible turning or rotation of the $\overline{B}_{(L)}$ or $\overline{B}_{(O)}$-vectors in the *x*-direction and, consequently, a diminution of the flux around the storage hole. In FIG. 2 there is shown the interrogation current $I_A$, the direction of the interrogation field $\overline{H}_A$, and the change of the induction $\overline{B}_{(L)}$ or $\overline{B}_{(O)}$ extending through the interrogation field. The resulting changes of induction are indicated by $\Delta\overline{B}_{(L)}$ or $\Delta\overline{B}_{(O)}$ respectively. On account of the induction or flux variations voltages, i.e. the read-out signals are induced in the conductor 5 associated with reading. With respect to the binary "L" or "O" respectively, the read-out signals are in phase opposition, but otherwise equal.

With reference to FIGS. 3*a* to 3*c* there will now be explained the novel mode of operation of the Biax memory element. The writing process is performed in the course of this in the same way as described hereinbefore, and with respect to the following explanation it is assumed that the Biax element, prior to the interrogation, is in a condition as represented by the two vectors $\overline{B}_{(L)}$ or $\overline{B}_{(O)}$ respectively.

For the interrogation purpose, current pulses are now applied simultaneously to both the conductor 4*a* or 4*b* associated with writing, and the conductor 6 associated with interrogation. On account of these current pulses there is now produced an interrogation field intensity $\overline{H}_R$ (FIG. 3*b*), the direction of which deviates from the *x*-direction. This interrogation field is due to a superposition of the field $\overline{H}_A$ resulting from the current in the conductor 6 associated with interrogation, and of the field $\overline{H}_B$ resulting from the current in the conductor 4*a* and 4*b* associated with writing. The current $I_B$ or the field intensity $\overline{H}_B$ is smaller than the current $I_A$ or the field intensity $\overline{H}_A$ respectively. In the course of this the direction of the current pulses $I_B$ is dependent upon the value of the second input variable.

If the additional field $\overline{H}_B$, e.g. as shown in FIG. 3*b*, is oriented in the same direction as the field occurring when writing-in a "L," then a Biax memory element into which an "L" has been written, will provide a less significant read-out signal than a Biax memory element into which a "O" has been written (FIG. 3*a*), i.e. $\Delta\overline{B}^*_{(L)}<\Delta\overline{B}^*_{(O)}$.

If the additional field is oriented in the same direction as the field occurring upon writing-in of an "O," the above statements apply correspondingly. In any case, in the event of a coincidence between the offered and the stored binary value, there will result a small or less significant output signal than in the case of a non-coincidence.

The logical equation which can be derived from this function, are as follows: (*a*=stored binary value, *b*=interrogation binary value)

$$L_a \ \& \ L_b V O_a \ \& \ O_b = U$$
$$L_a \ \& \ O_b V O_a \ \& \ L_b = \overline{U}$$

Thus it will be seen that the Biax memory element operates like an EXCLUSIVE-OR circuit.

This EXCLUSIVE-OR circuit can be inserted very advantageously as a cross-point element in an associative storage matrix. By the term associative storage there is to be understood such a type of storage device in which the information items are not retrievable on account of a certain local statement (local address), but on account of an address associated with the information (associative address). In the associative storage device, for the purpose of effecting the information output, the addresses of all information items are simultaneously interrogated by the search address, and those particular information items are fed out which are in agreement or in coincidence with the search address. Several different kinds of information items may thereby have the same address. In the normal type of storage device, however, always only one information is assigned to a certain address.

For inserting the Biax memory element in an associative storage device, there are still required two further conductors (see FIG. 1), i.e. an associative conductor 13 associated with interrogation, which is led through the interrogate hole 3, and an associative conductor 14 associated with reading, which is led through the storage hole 2.

The interconnection of e.g. four Biax memory elements acting as an EXCLUSIVE-OR circuit, in order to form a storage matrix capable of being operated either normally or associatively, is shown in FIG. 4. In this case all parts are indicated by the same reference numerals as in FIG. 1. The references are always shown on that particular side of the respective conductor, to which the signals are applied.

Both the word conductor 4*a* and the interrogate conductor 6 for the normal operation, horizontally traverse the matrix which, in this particular case, consists of 2 x 2 elements, and are controlled at the lefthand end, and the associative reading conductor 14 likewise traverses the matrix horizontally, but is controlled at the righthand end (rows Z1 and Z2). The digit conductor 4*b*, the associative interrogate conductor 13, as well as the reading conductor 5 for the normal operation extend through the matrix in a vertical fashion (columns S*p*1 and S*p*2).

FIG. 5 shows a block diagram relating to the electronic switching circuits forming part of a storage matrix 20 suitable for both the normal and the associative operation. The writing, interrogating and reading conductors are indicated by the same reference numerals as in FIG. 4.

During the normal operation the matrix operates as follows:

Writing

The address 32 is first of all applied to the address decoding circuit 21. The output signals of this circuit act directly upon a selecting matrix 22 for the writing conductors 4*a*. Since the matrix is composed of *m* rows, one of the *m* rows is being controlled or acted upon by the input of an address. The information 31 to be stored, is applied via a mask 24, to the digit generators 25 by which the information is applied in parallel to the writing conductors 4*b*. With the aid of the mask 24 it is possible to exclude an optional number of the *n* bits of the information 31. Accordingly, the information is written-in in a row-(word)-wise fashion on account of a coincidence of the current pulses on both the row and the column. For completely controlling the writing process there is still required the writing instruction 35 by which the devices 22 and 25 are rendered effective.

Erasing

During the erase procedure the controlling is similar as in the case of the writing. The erase process is tripped by the erase instruction 38.

Interrogation (reading)

In this case the address 32 is applied via the decoding circuit 21, to the read-out selecting matrix 23. The circuit applies the interrogate current to the row interrogation conductor 6 of the matrix 20, as determined by the address. The read-out signals of all columns are fed out in parallel via the read-out conductors 5, and are available at 29.

With respect to the associative operation of the matrix there will have to be distinguished between two cases:

(a) Associative interrogation without being followed by a writing-in, and (b) Associative interrogation which is followed by a writing-in, with it being presupposed in both cases that the information to be interrogated was written-in either in the normal way or in accordance with (b).

As regards (a), for the purpose of effecting the associative interrogation, a random number $p$ ($p \leqq n$) of the $n$ bits, of which the input into the blanking-out device 24 was effected at 31, is compared successively with the same points of all stored words. Accordingly, the interrogation is performed in a word-parallel and bit-serial manner. When assuming that the mask 24 covers-up as many as $p$ of the $n$ bits then the $(p-n)$ bits may be regarded as the associative address and the $(p)$ bits may be regarded as the information. Also the critical cases $n=p$ and $p=1$ are conceivable. During the interrogation all rows are marked in which the interrogating points are in agreement with the stored points. Subsequently to the interrogation process all rows are marked in the device 27, in which there exists an agreement (coincidence). The device 27 contains the row read-out amplifiers which are connected to the associative read-out conductors 14. Moreover, it comprises an arrangement for storing the information as to which rows have been marked, i.e. a storage for a $q$-out-of-$m$ code ($q \leqq m$), as well as an arrangement for converting this $q$-out-of-$m$ code into a number of $q$ individual 1-out-of-$m$ codes which are successively obtainable at 28. The output of the 1-out-of-$m$ codes is being controlled by the instruction 39.

The 1-out-of-$m$ codes are successively applied to the read-out selecting matrix 23. By this matrix there is effected the interrogation of the row as determined by the 1-out-of-$m$ code. The read-out signals are taken off in the same way as in a normal operation, at 29.

Accordingly, during the associative interrogation, first of all there are ascertained those rows of the information in which there is contained an associative address which is in agreement with the interrogation address, and subsequently thereto there is effected the feeding out of the information items of all of these rows, including the addresses.

In the case of (b), in which a writing can be effected after the associative interrogation, the associative interrogation process is performed as in the case of (a). The 1-out-of-$m$ codes appearing at the output 28 of the device 27, are now applied to the matrix 22 for selecting the writing conductors 4*a*. During the writing-in into one row, the address is covered up by the mask 24, and the associated information items are being written into this row. Hence, the associative address is first of all ascertained by way of an associative interrogation, and only thereafter there is effected the writing-in of the information relating to the address.

What is claimed is:

1. An Exclusive-OR circuit for two input variables utilizing a Biax memory element, the circuit comprising:

at least one said Biax memory element consisting of a uniform block of magnetic material having two orthogonal holes, the storage and interrogate holes, extending vertically in relation to one another and having an intermediate layer between the holes;

two writing conductors and a reading conductor are threaded through the storage hole;

an interrogation conductor threaded through the interrogate hole;

means for simultaneosly applying writing pulses to the two writing conductors to magnetize the storage in a given direction indicative of a first input variable;

means for applying a current pulse to the interrogating conductor to normalize the flux condition in the Biax memory element either before or after said writing pulses; and means for applying a first interrogating current pulse on the interrogating conductor, of the same polarity as the writing pulses, and means for coincidentally applying a second interrogating current pulse on one of the writing conductors, the second pulse having a polarity indicative of the second input variable, whereby in the case of agreement between the two input variables there is obtained an output signal of less significant amplitude than in the case of a non-agreement.

2. The circuit of claim 1 wherein the Biax memory element further includes an associative interrogate conductor threaded through the interrogate hole, and an associative read conductor threaded through the storage hole, the Biax memory forming part of a storage matrix suitable for both normal and associative operation.

3. The circuit of claim 2 wherein the Biax memory element forming part of the storage matrix has one of said writing conductors, said interrogate conductor, and said associative read conductor coupled in one row of the matrix, and has the other of said writing conductors, said reading conductor, and said associative interrogate conductor coupled in one column of said matrix.

References Cited

UNITED STATES PATENTS

| | | | |
|---|---|---|---|
| 2,985,768 | 5/1961 | Bobeck | 307—88 |
| 3,060,321 | 10/1962 | Woods | 307—88 |
| 3,061,820 | 10/1962 | Wanlass | 340—174 |
| 3,134,964 | 5/1964 | Wanlass | 340—174 |

STANLEY M. URYNOWICZ, Jr., Primary Examiner